(12) United States Patent
Becker (10) Patent No.: US 6,188,249 B1
(45) Date of Patent: Feb. 13, 2001

(54) ASYMMETRIC ARBITER WITH FAST SIGNAL PATH

(75) Inventor: Matthew Becker, Cambridge, MA (US)

(73) Assignee: Sun Microsystems, Inc., Palo Alto, CA (US)

(*) Notice: Under 35 U.S.C. 154(b), the term of this patent shall be extended for 0 days.

(21) Appl. No.: 09/107,310

(22) Filed: Jun. 30, 1998

(51) Int. Cl.[7] .................................................. H03K 5/19
(52) U.S. Cl. ............................ 327/19; 327/403; 370/462; 340/825.51
(58) Field of Search .................................. 327/18, 19, 261, 327/269, 271, 277, 403, 99; 377/56; 326/52; 711/150; 340/825.5, 825.51; 370/462

(56) References Cited

U.S. PATENT DOCUMENTS

| 4,398,105 | * | 8/1983 | Keller | 327/19 |
| 4,403,192 |   | 9/1983 | Williman | 327/19 |
| 4,924,220 |   | 5/1990 | Mihara et al. | 340/825.51 |
| 4,998,030 | * | 3/1991 | Cates | 327/19 |
| 5,049,766 | * | 9/1991 | Driest et al. | 327/269 |

FOREIGN PATENT DOCUMENTS

| 0552507A1 | 7/1993 | (EP) . |
| 0710911A1 | 5/1996 | (EP) . |
| WO 8704827 | 8/1987 | (WO) . |

* cited by examiner

*Primary Examiner*—Timothy P. Callahan
*Assistant Examiner*—Minh Nguyen
(74) *Attorney, Agent, or Firm*—Lahive & Cockfield, LLP (57) ABSTRACT

An asymmetric arbiter provides a fast signal path and a slow signal path. Signals may travel over the fast signal path in substantially less time than it takes for the signals to travel over the slow signal path. The fast signal path may be configured so as to impart only a minimal amount of delay. Signals that are to be frequently arbitrated by the arbiter may be applied to the fast signal path so as to minimize the delay introduced by the arbiter. The arbiter may include circuitry for detecting metastable conditions.

18 Claims, 9 Drawing Sheets

ASYMMETRIC ARBITER WITH FAST SIGNAL PATH

TECHNICAL FIELD

The present invention relates generally to electrical components and more particularly to an asymmetric arbiter having a fast signal path.

BACKOGROUND OF THE INVENTION

In conventional computer systems, there is often a need to arbitrate between two signals. In many instances, two signals may arrive in parallel but the signals must be processed sequentially. A circuit commonly known as an "arbiter" decides which signal may proceed first for processing.

Conventional arbiters are "symmetric" in that both signal paths are roughly equal in terms of the delays. In other words, for a given pair of inputs, a and b, it takes approximately the same amount of time for one of the outputs of the arbiter (e.g. a-out or b-out) to appear. The symmetry between the signal paths helps to insure that neither signal is favored to win. As a result, the arbiter greatly simplifies the circuit analysis required for the environment in which the arbiter is present.

One of the drawbacks of such conventional arbiters is that they provide uniformity in the amount of delay at the price of ignoring potential optimizations.

SUMMARY OF THE INVENTION

The present invention addresses the limitations of the prior art by providing an asymmetric arbiter that includes a fast path over which one signal may travel very quickly. For an uncontested signal, the amount of delay introduced by the fast path is negligible. The fast path may be used by signals that appear frequently to minimize the amount of delay introduced by the arbiter. The other path in the arbiter (known as the "slow path") may be used for signals that appear less frequently. The slow path is especially well adapted for signals in which delay is not a critical issue.

The arbiter operates by arbitrating between two signals at its inputs to allow one of the signals to pass through. The choice between the signals is based upon the time at which the signals arrive at the inputs. If a signal arrives early enough relative to the other signal, the earlier arriving signal forces the other signal path to become "closed" or "opaque." The other signal can only get through after an acknowledge signal is received from the first signal path, indicating that the earlier arriving signal has been fully processed and that the system is ready to receive the other signal. The arbiter includes logic elements for making decisions as to which path is open and which path is closed.

The fast signal path may include a component for eliminating unwanted runt pulses. In one embodiment, this component is realized as a special variety of inverter. A Schmitt trigger may be a suitable component for preventing such unwanted runt pulses.

The slow signal path may include a delay element for imparting a fixed amount of delay. The fast signal path may include no such delay element and preferably introduces a negligible amounts of delay.

BRIEF DESCRIPTION OF THE DRAWINGS

An illustrative embodiment consistent with the principles of the present invention will be described below relative to the following drawings.

DETAILED DESCRIPTION OF THE INVENTION

The illustrative embodiment consistent with the principles of the present invention provides an asymmetric arbiter that includes a fast signal path which introduces a minimal amount of delay and a slow signal path that introduces a more substantial amount of delay. In the illustrative embodiment of the present invention, only 350 ps of delay is introduced by the fast signal path. The fast signal path may be utilized by more frequently appearing signals (than the signals that are applied to the slow path) to optimize use of the arbiter.

The arbiter includes logic circuitry for opening and closing the respective signal paths. The arbiter is designed so that the fast signal path is opened initially. The input signals control whether to close the fast signal path. When a path is "open," a signal may traverse the path but when a path is "closed," the signal is blocked from traversing the path. The skewing of the decision process towards the fast signal path results in lower latency.

In the illustrative embodiment consistent with the principles of the present invention, the signals encode information in voltage levels, and "transitions" refer to transitions between a voltage level that encodes a high logic state and a voltage level that encodes a low logic state (i.e. from high to low or from low to high). Thus, if a signal transitions at the input to the fast path prior to a transition at the input to the slow path, the fast path remains open and the slow path is closed by the logic circuitry within the arbiter. Conversely, when a transition appears first at the input to the slow path, the fast path is closed and the slow path is opened.

There may be instances wherein the signals transition at the inputs very close together. In such instances, an internal node on the fast signal path within the arbiter may enter a metastable state. The slow path includes a delay element which gives the internal node time to enter the metastable state. Logic in the arbiter insures that the slow path is closed while the internal node is in the metastable state. Thus, the metastability of the internal node does not result in false output signals.

The arbiter used in the illustrative embodiment operates with information encoded as voltage levels. In particular, a high logic state is encoded by a voltage level of about 3.3 volts and a low logic state is encoded by a voltage of about 0 volts. The arbiter becomes active when signals at the input to the arbiter transition from the about 0 volts to about 3.3 volts or from about 3.3 volts to about 0.

Those skilled in the art will appreciate the present invention need not be limited to signals that encode information in the voltage domain or at the specified voltage levels. The present invention may also be practiced with signals that encode information in current levels, charge levels and the like. Moreover, the high and low logic states may be encoded by voltage levels other than about 0 volts and about 3.3 volts.

Figure 1:
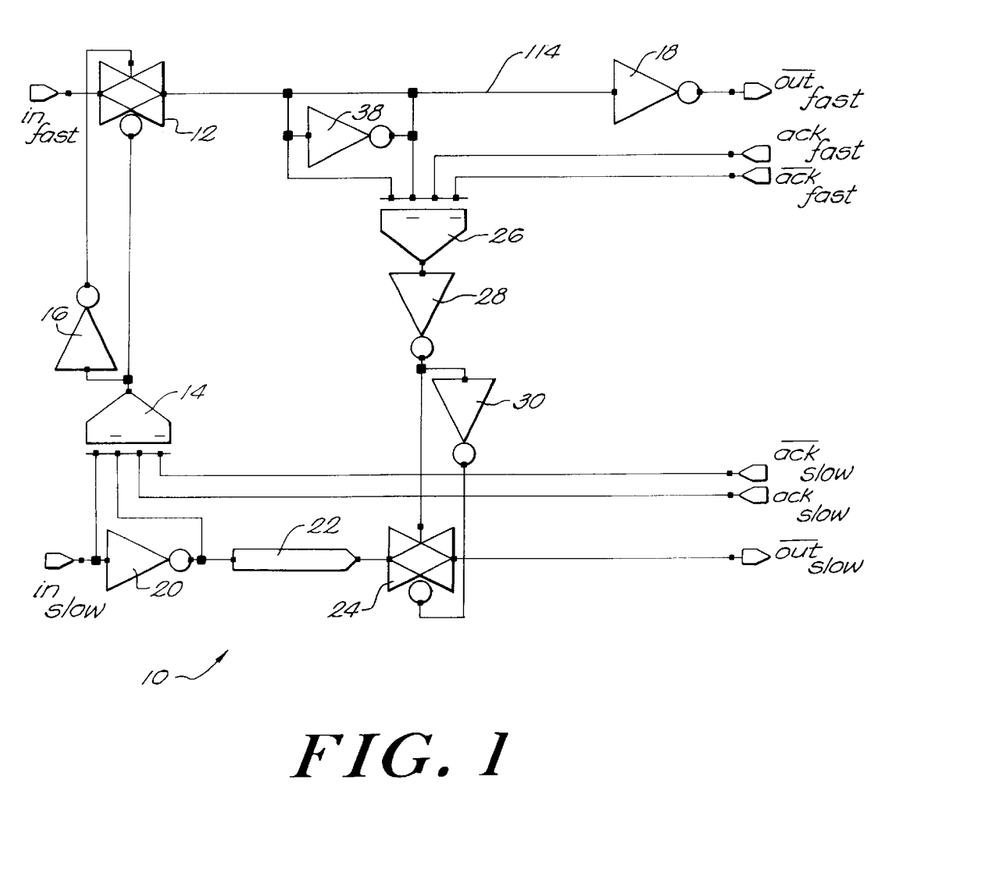
FIG. 1 depicts an electrical circuit that is suitable for implementing the arbiter of the illustrative embodiment.

FIG. 1 depicts an arbiter circuit 10 for practicing the illustrative embodiment of the present invention. The arbiter 10 includes a fast signal path that has an $in_{fast}$ input and a complemented output $\overline{out}_{fast}$. The arbiter circuit 10 also includes a slow signal path having an $in_{slow}$ input and a complemented $\overline{out}_{slow}$ output. The more frequently occurring signals that are to be arbitrated by the arbiter are tied to the $in_{fast}$ (i.e., the fast path) input and the less frequently occurring signal is tied to the $in_{slow}$ input (i.e., the slow path).

A pass gate 12 is connected to the $in_{fast}$ input to control whether the fast signal path is opened or closed. The pass gate 12 may be implemented by two transistors or by alternative configurations. When the pass gate 12 is "transparent", the fast signal path is open and the $in_{fast}$ signal is able to propagate through the fast signal path, whereas when the pass gate 12 is "opaque", the fast signal path is closed and the $in_{fast}$ signal is not able to propagate through the fast signal path. When the pass gate 12 is transparent, the $in_{fast}$ signal reaches inverter 18, which inverts the signal to produce the $\overline{out}_{fast}$ output. The output is processed and an acknowledge signal $ack_{fast}$ and its complement $\overline{ack}_{fast}$ are produced to evidence that the signal has been received and that the slow signal path should be re-opened. The acknowledge signals may be generated by components that are external to the arbiter circuit. The nature of the component that generates the acknowledge signals depends on the application for which the arbiter circuit 10 is being used.

Figure 2:
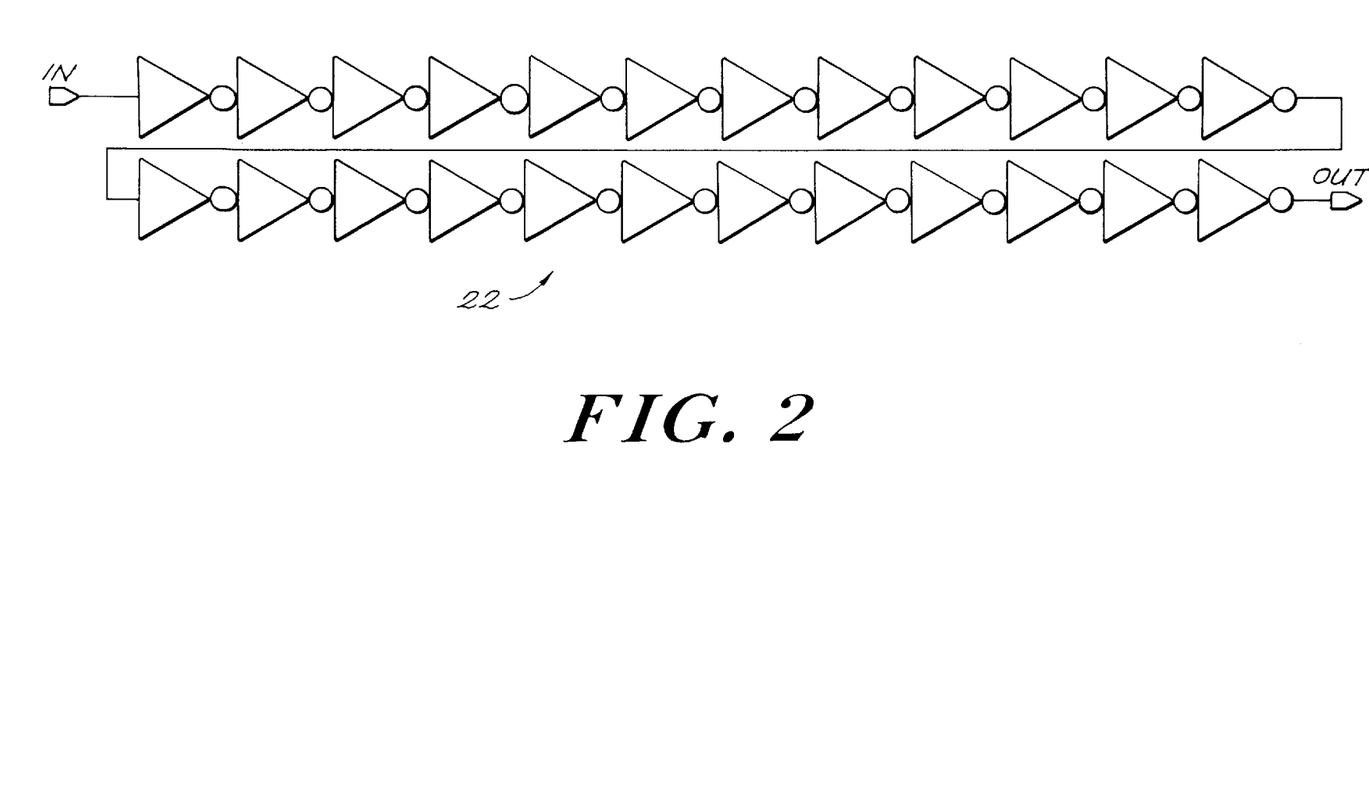
FIG. 2 depicts the delay element 22 or FIG. 1 in more detail.

The signal at the $in_{slow}$ input passes through inverter 20, which inverts the signal. The signal then passes through delay element 22. In the illustrative embodiment of the present invention, the delay element 22 introduces twenty four inverter delays. FIG. 2 depicts the delay element 22 in more detail. The delay element comprises a sequence of twenty-four inverters that are tied together in series. Those skilled in the art will appreciate that other configurations may be used for the delay elements and that the delay element 22 may impart a different amount of delay as needed to practice the present invention. The output of the delay element 22 is tied to pass gate 24. When the pass gate 24 is transparent, the inverted signal is output as $\overline{out}_{slow}$. When the pass gate 24 is closed, the output of the delay element 22 is prevented from propagating to the output of the slow signal path. The control inputs to pass gates 12 and 24 will be discussed in more detail below.

Acknowledge signals are also produced for the output of the slow signal path. In particular, when the $\overline{out}_{slow}$ signal is fully processed, a pair of acknowledge signals are returned to the arbiter. This pair includes an $ack_{slow}$ acknowledge signal and $\overline{ack}_{slow}$.

As will be described in more detail below, the acknowledge signals are used as inputs to logic circuitry that controls the pass gates.

Pass gate 12 on the fast signal path is controlled by the output of an exclusive OR (XOR) gate 14. In particular, pass gate 12 has two control inputs that are tied to it (i.e. to the respective transitions in the pair that makes up the pass gate). One control input is tied directly to the output of the XOR gate 14. The other control input is tied to the output of inverter 16 which complements the output of the XOR gate 14. The XOR gate 14 has four inputs, the acknowledge signal $ack_{slow}$, $\overline{ack}_{fast}$, $in_{slow}$ and $\overline{in}_{slow}$. The XOR gate 14 produces an output that is logically equal to the XOR of $in_{slow}$ and $ack_{slow}$.

Those skilled in the art will appreciate that the switched semiconductor elements of the arbiter may be implemented using different varieties of transistors including bipolar transistors and field effect transistors. Moreover, the transistors may be npn or pnp type transistors.

Figure 3:
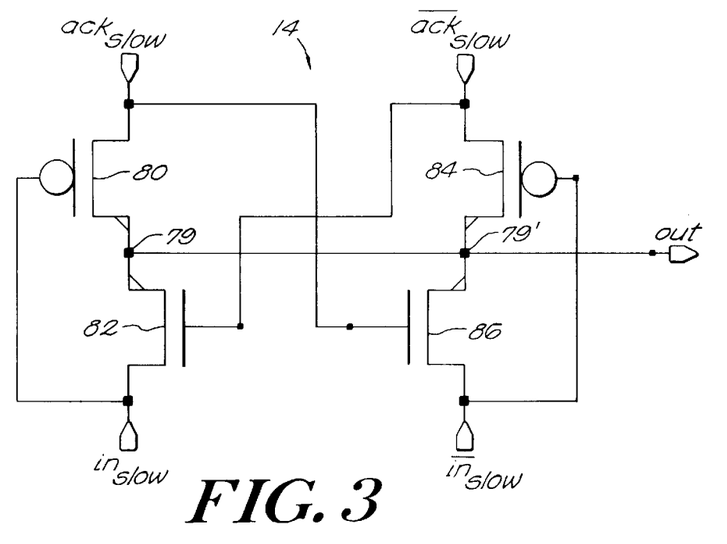
FIG. 3 depicts the exclusive OR gate 14 of FIG. 1 in more detail.
Figure 5:
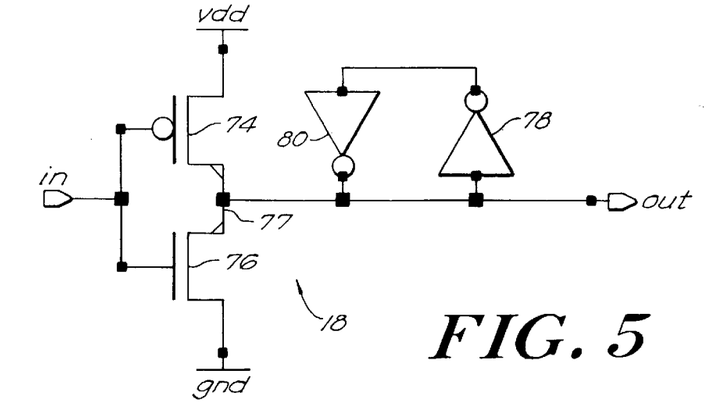
FIG. 5 depicts the special variety of inverter 18 of FIG. 1 in more detail.

FIG. 3 depicts XOR gate 14 in more detail. The $in_{slow}$ signal is tied to the source of n-channel metal oxide semiconductor field effect transistor (MOSFET) 82, and $\overline{ack}_{slow}$ is applied to the gate of n-channel MOSFET 82. Thus, the drain of n-channel MOSFET 82 has a logic value that can be expressed as ($in_{slow}$ AND $\overline{ack}_{slow}$). The $ack_{slow}$ signal is tied to the source of p-channel MOSFET 80. The $in_{slow}$ signal is applied to the gate of p-channel MOSFET 80. The drain of p-channel MOSFET 80 has a logic state that can be expressed as ($\overline{in}_{slow}$ AND $ack_{slow}$). Since MOSFETs 80 and 82 are connected in series as shown in FIG. 5, the voltage at point 79 may be expressed as ($in_{slow}$ AND $\overline{ack}_{slow}$) OR ($\overline{in}_{slow}$ AND $ack_{slow}$).

The $\overline{in}_{slow}$ signal is tied to the source of n-channel MOSFET 86 and $ack_{slow}$ is tied to the gate. As a result, the logic state of the drain of n-channel MOSFET 86 can be expressed as ($\overline{in}_{slow}$ AND $ack_{slow}$). The source of p-channel MOSFET 84 is tied to the $\overline{ack}_{slow}$ signal, and the $in_{slow}$ signal is applied to the gate of p-channel MOSFET 84. The logic state at the drain of p-channel MOSFET 84 may be expressed as ($in_{slow}$ AND $\overline{ack}_{slow}$). Given the coupling of the drains of MOSFETs 84 and 86, the logic state at point 79' may be expressed as ($\overline{in}_{slow}$ AND $ack_{slow}$) OR ($in_{slow}$ AND $\overline{ack}_{slow}$). The output of XOR gate 14 may, therefore, be expressed as the logical OR of the values at points 79 and 79', which may also be expressed in simplified form as ($in_{slow}$ XOR $ack_{slow}$).

The pass gate 12 is transparent when the inputs to the pass gate are logically equal. The output of the XOR gate 14 is logically low when the input signal $in_{slow}$ is logically low and the acknowledge signal $ack_{slow}$ is logically low or when the acknowledge signal $ack_{slow}$ is logically high and the input signal $in_{slow}$ is logically high. These signal pairings arise when the slow signal path is not being used.

Figure 4:
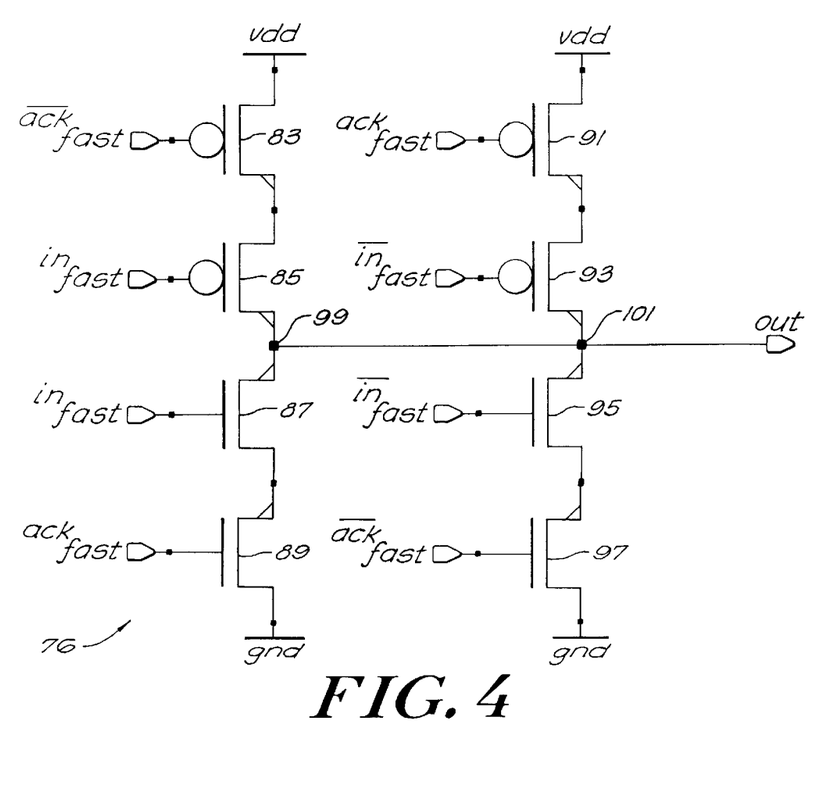
FIG. 4 depicts the exclusive OR gate 26 of FIG. 1 in more detail.

XOR gate 26 controls pass gate 24 on the slow signal path. XOR gate 26 has four inputs: $in_{fast}$, $\overline{in}_{fast}$, $ack_{fast}$ and $\overline{ack}_{fast}$. FIG. 4 depicts XOR gate 26 in more detail. MOSFETs 83, 85, 87 and 89 are tied together serially as shown in FIG. 4. The source of p-channel MOSFET 83 is tied to a reference voltage that corresponds to a high logic level. The drain of n-channel MOSFET 89 is tied to ground, which corresponds to a low logic level. The $\overline{ack}_{fast}$ signal is applied to the gate of p-channel MOSFET 83. Thus, a logically high voltage level will be found at the drain of p-channel MOSFET 83 when $\overline{ack}_{fast}$ is low. The gate of p-channel MOSFET 85 is tied to the $in_{fast}$ input. Hence, p-channel MOSFET 85 is open when $in_{fast}$ is logically low. The gate of n-channel MOSFET 89 is tied to $ack_{fast}$ and produces a logically low output at its drain when $ack_{fast}$ is logically high. The gate of n-channel MOSFET 87 is tied to the $in_{fast}$ input. Hence, n-channel MOSFET 87 is open when in$_{fast}$ is logically high. The logic state at point 99 can be expressed as ($\overline{in}_{fast}$ AND ack$_{fast}$) AND (NOT in$_{fast}$ AND ack$_{fast}$)).

The ack$_{fast}$ signal is applied to the gate of p-channel MOSFET 91. The in$_{fast}$ signal is applied to the gate of p-channel MOSFET 93. As a result, a logically high output is produced at point 101 when the ack$_{fast}$ signal is logically low and the in$_{fast}$ signal is logically high. The $\overline{ack}_{fast}$ signal is applied to the gate of n-channel MOSFET 97, and the source of n-channel MOSFET 97 is tied to ground. The $\overline{in}_{fast}$ signal is tied to the gate of n-channel MOSFET 95. Hence, a logically low output is produced when the in$_{fast}$ and ack$_{fast}$ signals are both logically low. The output at point 101 may be expressed as (ack$_{fast}$ AND $\overline{in}_{fast}$) AND (NOT ($\overline{in}_{fast}$ AND $\overline{ack}_{fast}$)). As a result of the connection of points 99 and 101, the output of the XOR gate 26 may be expressed as (in$_{fast}$ XOR ack$_{fast}$).

XOR gate 26 differs from XOR gate 14, as can be seen by comparing FIGS. 3 and 4. XOR gate 26 includes logic for ensuring that the slow path is closed while the internal node is in a metastable state. XOR gate 14 lacks such logic.

The output of the XOR gate 26 (FIG. 1) is inverted by inverter 28 and is applied as one of the control inputs to the pass gate 24 in the slow signal path. The output of inverter 28 is inverted by inverter 30 and then further complemented before being applied to the other control input of the pass gate 24. As a result the pass gate 24 is transparent when the output of the XOR gate 26 is low.

FIG. 5 depicts the inverter 18 on the fast signal path in more detail. The input is applied to the gate of n-channel MOSFET 76 and to the gate of p-channel MOSFET 74. The source of n-channel MOSFET 76 is tied to ground, corresponding to a logically low voltage level. The source of p-channel MOSFET 74 is tied to a reference voltage corresponding to a logically high voltage level. Hence, the output produced at point 77 is the inverse of that applied to the input. With Inverters 78 and 80 eliminate runt pulses (i.e. pulses of small magnitude caused by noise) so that such unwanted runt pulses do not appear on the output of the inverter 18. The configuration depicted in FIG. 4 acts as a Schmitt trigger to only be triggered when the input has transitioned by a sufficient voltage magnitude.

Figure 6:
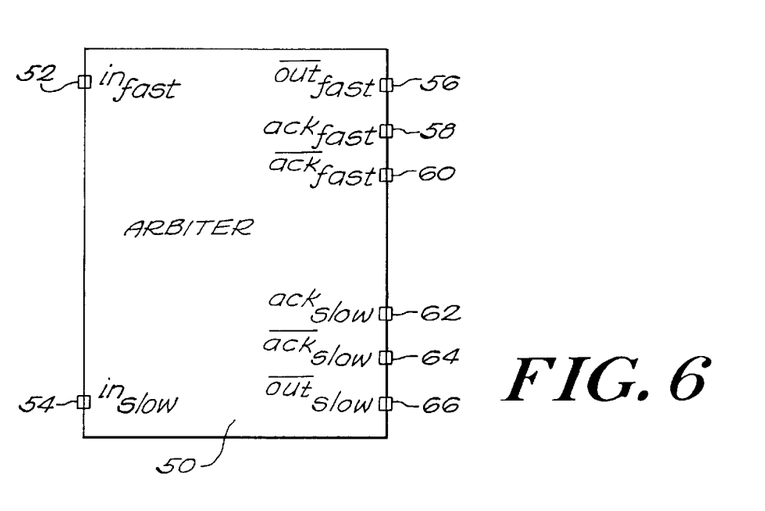
FIG. 6 depicts an example pin layout when the arbiter is implemented as an integrated circuit.

The arbiter circuit 10 may be implemented as part of an integrated circuit. In such an instance, the pin layout may be as shown in FIG. 6. Specifically, pin 52 is used for the in$_{fast}$ signal input and pin 54 is used for the in$_{slow}$ signal input. The integrated circuit package 50 also includes pin 56 for the out$_{fast}$ output and pin 66 for the $\overline{out}_{slow}$ output. The acknowledge signals ack$_{fast}$ and $\overline{ack}_{fast}$ may be applied to pins 58 and 60, respectively. Similarly, the acknowledge signals ack$_{slow}$ and $\overline{ack}_{slow}$ may be applied to pins 62 and 64, respectively. Those skilled in the art will appreciate that the pin assignments depicted in FIG. 6 are intended to be illustrative and not limiting of the present invention.

Figure 7:
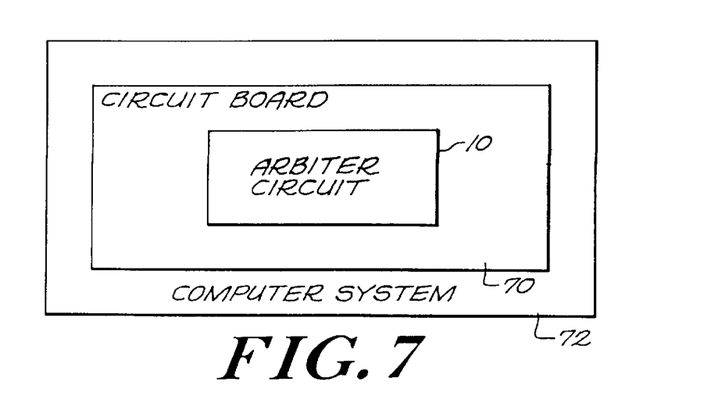
FIG. 7 depicts the positioning of the arbiter circuit within a computer system.

The arbiter circuit, however need not be integrated into an integrated circuit package. Alternatively, the arbiter may be part of a circuit that is present on a circuit board or other medium. In the illustrative embodiment consistent with the principles of the present invention, the arbiter circuit (whether it is an integrated circuit package or not) is present on a circuit board 70, and the circuit board is part of a computer system 72 as shown in FIG. 7.

Figure 8A:
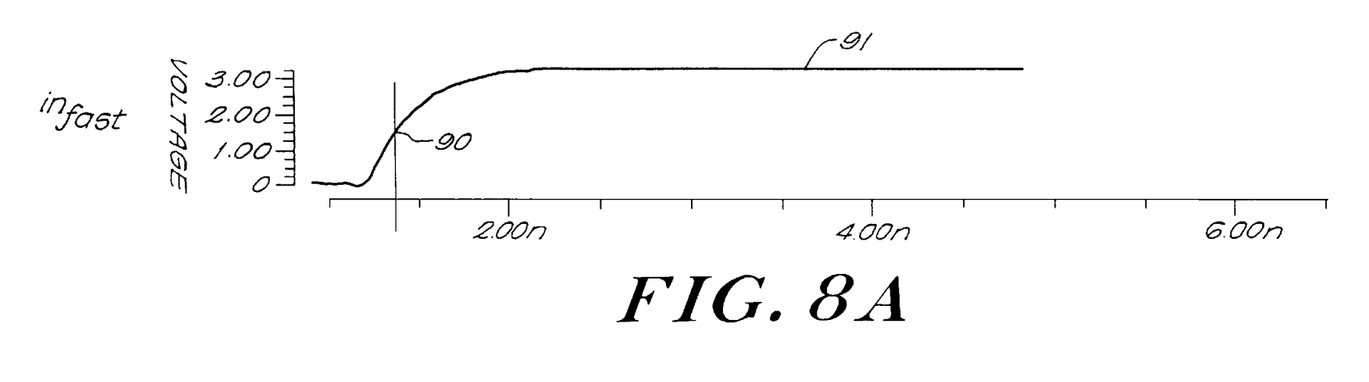
FIGS. 8A–8D depict the state of inputs and outputs of the arbiter when the $in_{fast}$ signal transitions well before the $in_{slow}$ signal.
Figure 8B:
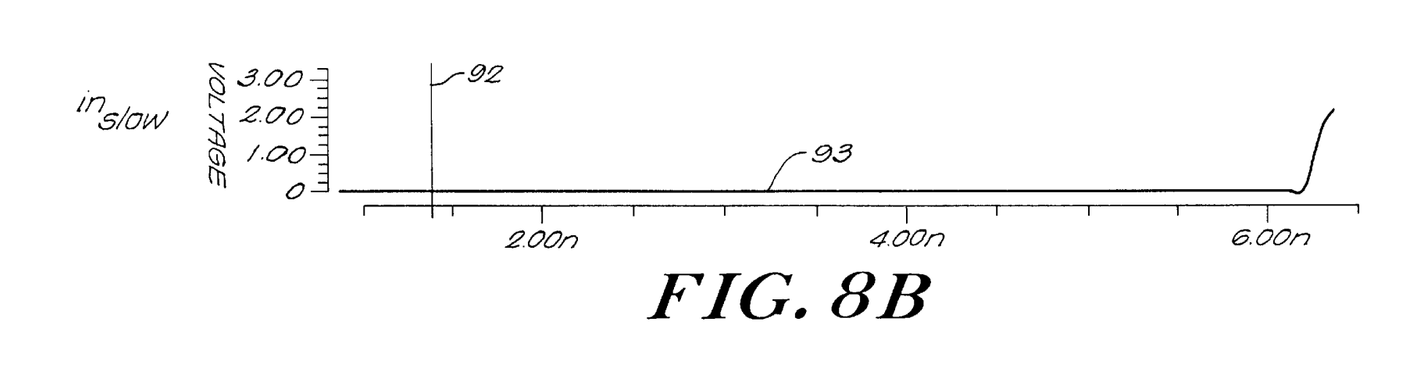
Figure 8C:
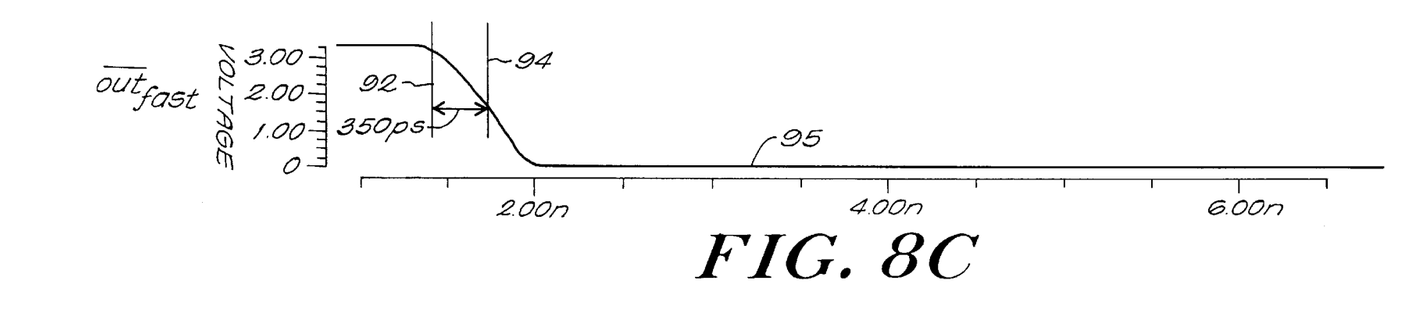
Figure 8D:
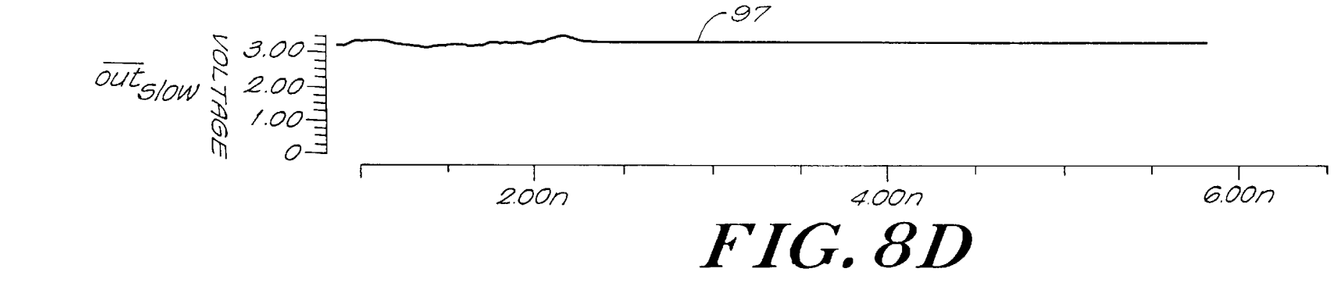
Figure 9A:
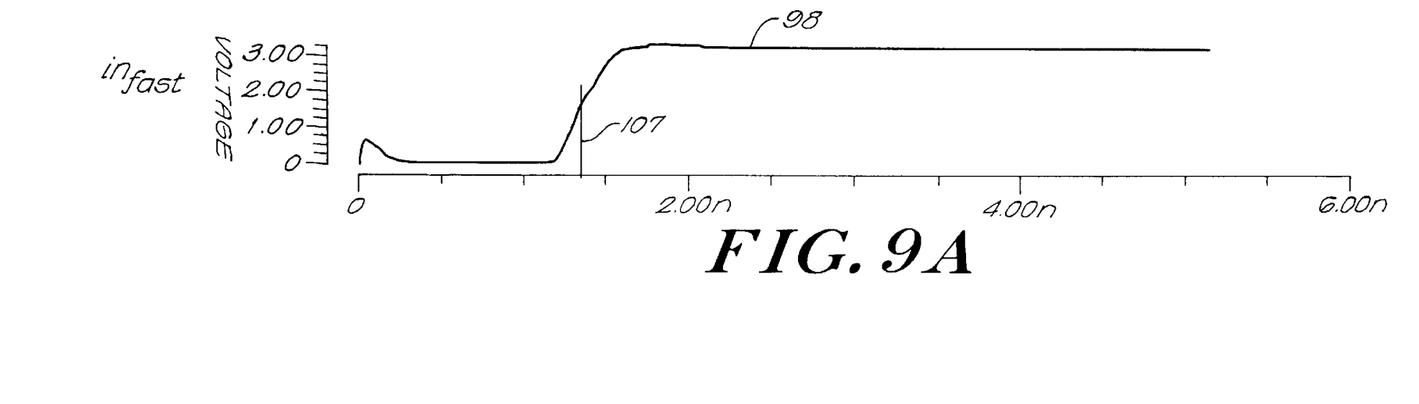
FIGS. 9A–9D depict the state of the inputs and outputs of the arbiter when he $in_{slow}$ signal transitions well before to the $in_{fast}$ signal.
Figure 9B:
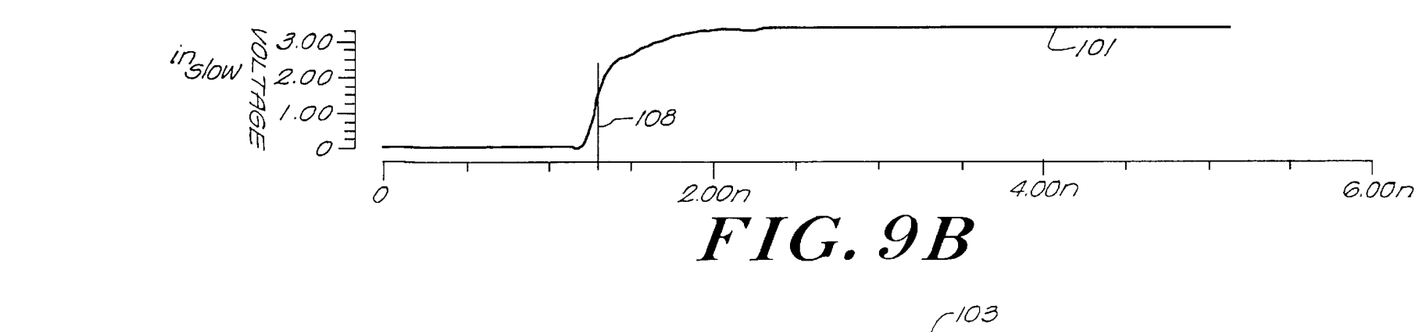
Figures 9C, 9D:
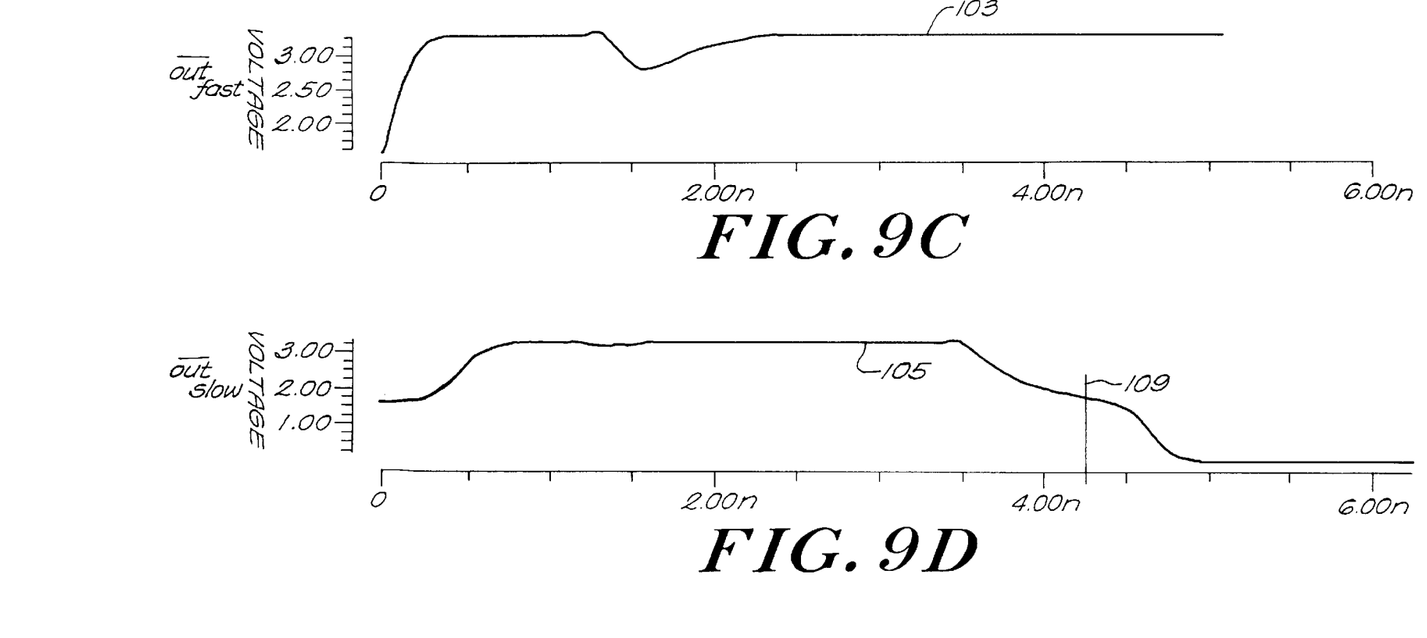

FIGS. 8A–8D illustrate the operation of the arbiter circuit 10 when the in$_{fast}$ signal transitions well before the in$_{slow}$ signal. In the example graphs shown in FIGS. 8A–8D, the logically high level is about 3.3 volts and the logically low level is 0 volts. As can be seen in FIG. 8A, the in$_{fast}$ input is initially of a logically low level of about 0 volts and then transitions up to about 3.3 volts. The curve 91 shows this transition and the marker 90 depicts the halfway point (i.e. about 1.65 volts) that occurs at time 92. The in$_{slow}$ input signal remains low in this instance as shown by curve 93 in FIG. 8B. The $\overline{out}_{fast}$ output produces a corresponding complemented output to the in$_{fast}$ signal after a mere 350 ps delay. (See as in FIG. 8C.) As shown in FIG. 8C, time reference point 94 follows time reference point 92 by a mere 350 ps. The $\overline{out}_{slow}$ output remains in a logically high state as illustrated by curve 97 in FIG. 8D.

FIGS. 9A–9D illustrate an instance wherein the in$_{slow}$ input transitions well before the in$_{fast}$ input. As can be seen with reference to FIGS. 9A and 9B, curve 101 corresponding to the in$_{slow}$ input reaches transition at time 108, which precedes the time 107 on curve 98 at which in$_{fast}$ reaches transition. The $\overline{out}_{fast}$ output retains its logically high value as indicated by curve 103 in FIG. 9C. The $\overline{out}_{slow}$ output (as indicated by curve 105 in FIG. 9D) eventually transitions at time 109. Thus, the transition for the slow signal path occurs substantially later than for the fast signal path without occurring too late.

Figure 10A:
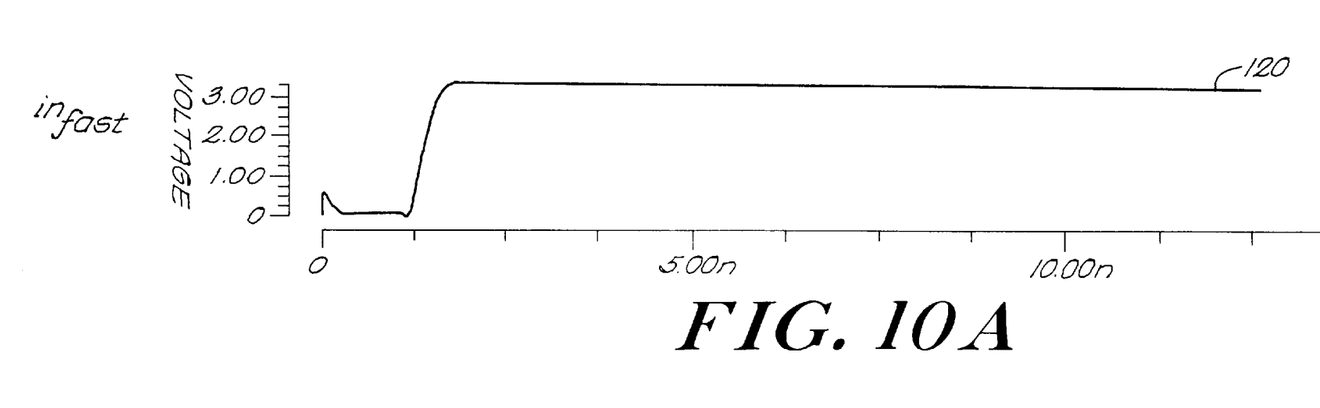
FIGS. 10A–10E illustrate the state of inputs, outputs and an internal node of the arbiter when the $in_{fast}$ signal transitions in close proximity to the $in_{slow}$ signal at the arbiter.
Figure 10B:
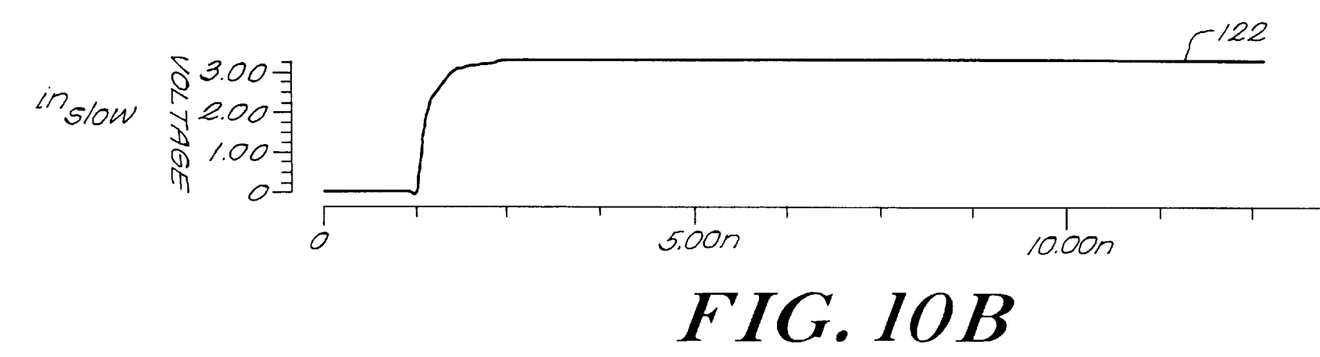
Figure 10C:
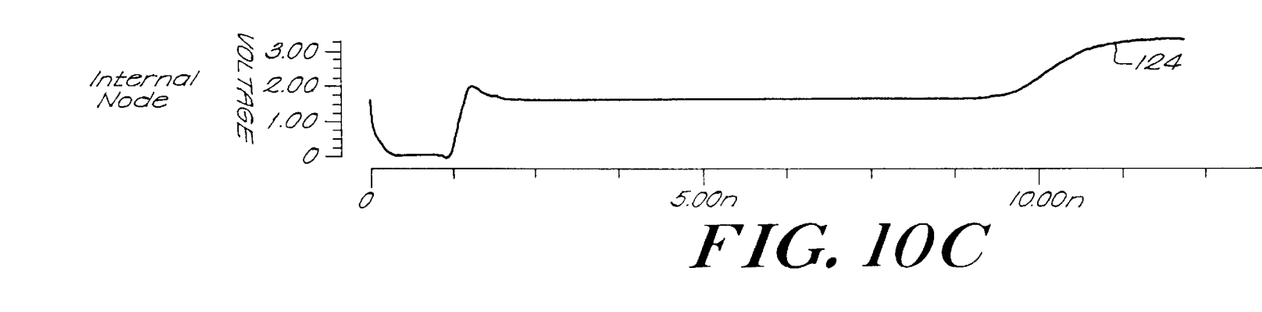
Figure 10D:
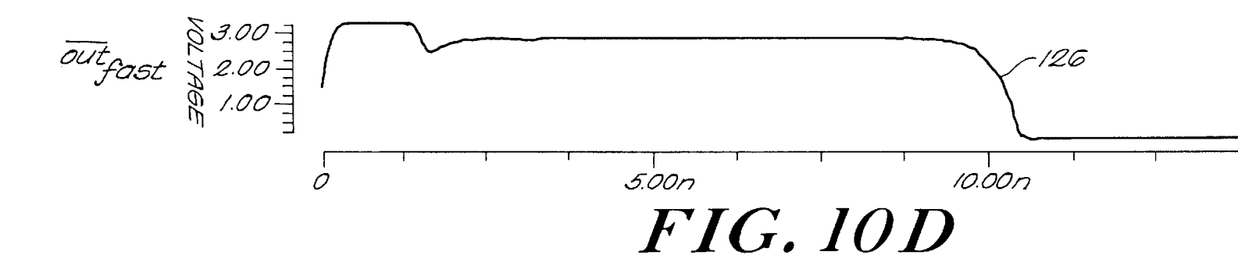
Figure 10E:
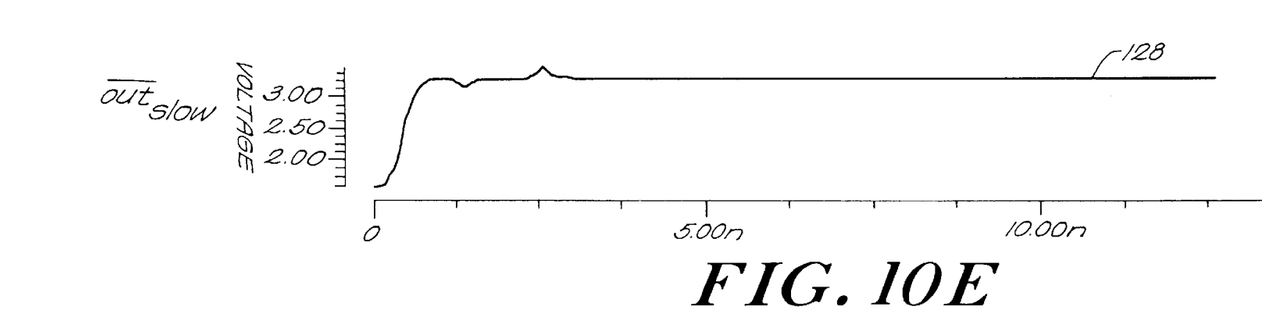

FIGS. 10A–10E illustrate a case when the in$_{fast}$ signal and the in$_{slow}$ signal transition at approximately the same time. Curve 120 in FIG. 10A and curve 122 transition at roughly the same time as shown in FIGS. 10A and 10B, respectively. The internal node 114 (FIG. 1) enters a metastable state as indicated by curve 124 in FIG. 10C. In particular, the curve is fixed at a voltage of approximately 1.65 volts. While the internal node is in the metastable state, the outputs $\overline{out}_{fast}$ and out$_{slow}$ remain logically high (indicating that both signal paths have not yet passed) until the metastability resolves itself. In this instance, the metastability resolves itself to a logically high value at the internal node 114. Hence, the $\overline{out}_{fast}$ output becomes logically low as indicated by curve 126 in FIG. 10C, and the $\overline{out}_{slow}$ signal remains high as indicated by curve 128 in FIG. 10E. In other words, the fast signal path passes while the slow signal path remains closed. It should be appreciated that the metastability may also resolve itself in a low fashion. The delay element 22 provides time for the internal node to enter metastability. The XOR gate 26 recognizes the metastable state at the internal node and closes pass gate 24. Without the delay element, a signal could travel the slow path while the internal node is in the metastable state. If the metastability were to resolve itself to open the fast path, signals could be present on both signal paths at the same time. In such a case, the arbiter fails to serve its intended purpose.

The size of the p-channel MOSFETs 83,85 91 and 93 and the n-channel MOSFETs are chosen to close the pass gate 24 while the internal node is in metastability. For example, 12 micron p-channel MOSFETs may be used in conjunction with 1.2 micron n-channel MOSFETs.

While the present invention has been described with reference to a preferred embodiment thereof, those skilled in the art will appreciate that various changes in form and detail may be made without departing from the intended scope of the present invention as defined in the appended claims. For example, different varieties of circuits may be used to practice an illustrative embodiment of the present invention. Moreover, different varieties of electrical components may be used to practice the present invention. Thus, bipolar transistors may be used rather than FET's.

What is claimed is:

1. An arbiter for arbitrating between a first signal at a first input and a second signal at a second input, the arbiter comprising:

a first path connecting the first input of The arbiter with a first output of the arbiter, the first path having a first delay associated with propagation of the first signal from the first input to the first output;

a second path connecting the second input of the arbiter with a second output of the arbiter, the second path having a second delay associated with propagation of the second signal from the second input to the second output, the second delay being substantially greater than the first delay;

logic elements for designating, as a closed path, a path selected from the first path and the second path, the closed path having a closed path input and a closed path output, said closed path output being independent of the closed path input;

designating, as an open path, a path selected from the first path and the second path, the open path having an open path input and an open path output, said open path output being dependent on the open path input;

a pass gate which is a transmission gate for the second path, responsive to at least one of the logic elements, that opens and closes the second path; and a pass gate which is a transmission gate for the first path, responsive to at least one of the logic elements, that opens and closes the first path.

2. The arbiter of claim 1 wherein the second path comprises a delay element for imparting a non-negligible delay when the signal travels over the second path.

3. The arbiter of claim 1 wherein the first path comprises a component for blocking signal pulses having a magnitude below a given threshold.

4. The arbiter of claim 3 wherein the component for blocking signal pulses comprises an inverter.

5. The arbiter of claim 4 wherein the component for blocking signal pulses comprises a Schmitt trigger.

6. The arbiter of claim 1 wherein the logic elements comprise a first XOR gate that controls the pass gate for the second path, and a second XOR gate that controls the pass gate for the first path.

7. The arbiter of claim 1 wherein the logic elements designate a path selected from a set including the first path and the second path to be a closed path when a metastable state is reached.

8. The arbiter of claim 1 wherein the logic elements designate a closed path and an open path on the basis of when transitions in voltage levels in the first signal at the first input and the second signal at the second input occur.

9. The arbiter of claim 8 wherein the transitions in voltage levels include both transitions from a high voltage level representing a first logic state to a low voltage level representing a second logic state and transitions from the low voltage level to the high voltage level.

10. The arbiter of claim 8 wherein the arbiter is packaged in an integrated circuit.

11. An arbiter, comprising:

a first signal path having a first-signal-path delay associated with propagation of a first signal along the first signal path, a second signal path having a second-signal-path delay associated with propagation of a second signal along the second signal path, the second-signal-path delay being substantially greater that the first-signal-path delay;

a first pass gate on the first signal path for opening and closing the first signal path;

a second pass gate on the second signal path for opening and closing the second signal path; and a metastability detector for determining whether a first signal at an input to the first signal path and a second signal at an input to the second signal path are in a metastable state, and, where the first and second signals have exited the metastable state, opening a selected one of the first and second signal paths so that the signal at the input of the selected path is permitted to propagate along the selected path, and opening the other one of the first and second signal paths so that the signal at the input of the other path is permitted to propagate along the other path.

12. The arbiter of claim 11 wherein the first signal path and the second signal path carry electrical signals.

13. The arbiter of claim 12 wherein the arbiter is packaged in an integrated circuit.

14. A circuit for arbitrating between transition encoded electrical signals, comprising:

an input to a first signal path;

an input to a second signal path;

a first pass gate on the first signal path for controlling whether an input signal at the input to the first signal path is blocked;

a first exclusive or (XOR) gate for controlling the first pass gate, said first XOR gate taking an exclusive or of a signal at the input to the second signal path and a first acknowledge signal that indicates that an earlier arrived signal has completed traveling the second signal path;

a second pass gate on the second signal path for controlling whether an input signal at the input to the second signal path is blocked; and a second XOR gate for controlling the second pass gate, said second XOR gate taking an exclusive or of a signal at the input of the first signal path and a second acknowledge signal that indicates that a previously arrived signal has completed traveling the first signal path.

15. The circuit of claim 14 further comprising an inverter along the first signal path for blocking runt pulses.

16. The circuit of claim 15 wherein the inverter is a Schmitt trigger.

17. The circuit of claim 14 further comprising a delay element along the second signal path for imparting a delay.

18. The circuit of claim 14 wherein the second XOR gate includes logic for causing the second pass gate to close to block the input signal at the input to the second signal path when the input signal at the input to the second signal path and the input signal at the input to the first signal path are in a metastable state.

* * * * *

UNITED STATES PATENT AND TRADEMARK OFFICE
CERTIFICATE OF CORRECTION

PATENT NO.     : 6,188,249 B1
DATED          : February 13, 2001
INVENTOR(S)    : Matthew Becker It is certified that error appears in the above-identified patent and that said Letters Patent is hereby corrected as shown below:

Column 1,
Line 9, please replace "BACKOGROUND OF THE INVENTION" with -- BACKGROUND OF THE INVENTION --;

Column 2,
Line 20, please replace "arbiter when he in$_{slow}$ signal" with
-- arbiter when the in$_{slow}$ signal --;

Column 3,
Line 46, please replace "twenty four" with -- twenty-four --;

Column 5,
Line 3, please replace "AND (NOT in$_{fast}$ and ack$_{fast}$)" with
-- AND NOT (in$_{fast}$ AND ack$_{fast}$) --;
Line 49, please replace "for the out $_{fast}$" with -- for the $\overline{out}_{fast}$ output --;

Column 6,
Line 2, please replace "in$_{fast}$ input is initially of a logically" with
-- in$_{fast}$ input is initially at a logically --;

Column 7,
Line 1, please replace "input of The arbiter with" with -- input of the arbiter with --;

Signed and Sealed this

Twenty-sixth Day of February, 2002

Attest:

*Attesting Officer*

JAMES E. ROGAN
*Director of the United States Patent and Trademark Office*